No. 877,141. PATENTED JAN. 21, 1908.
T. C. THOMPSON.
CONVEYER.
APPLICATION FILED FEB. 18, 1907.
3 SHEETS—SHEET 2.
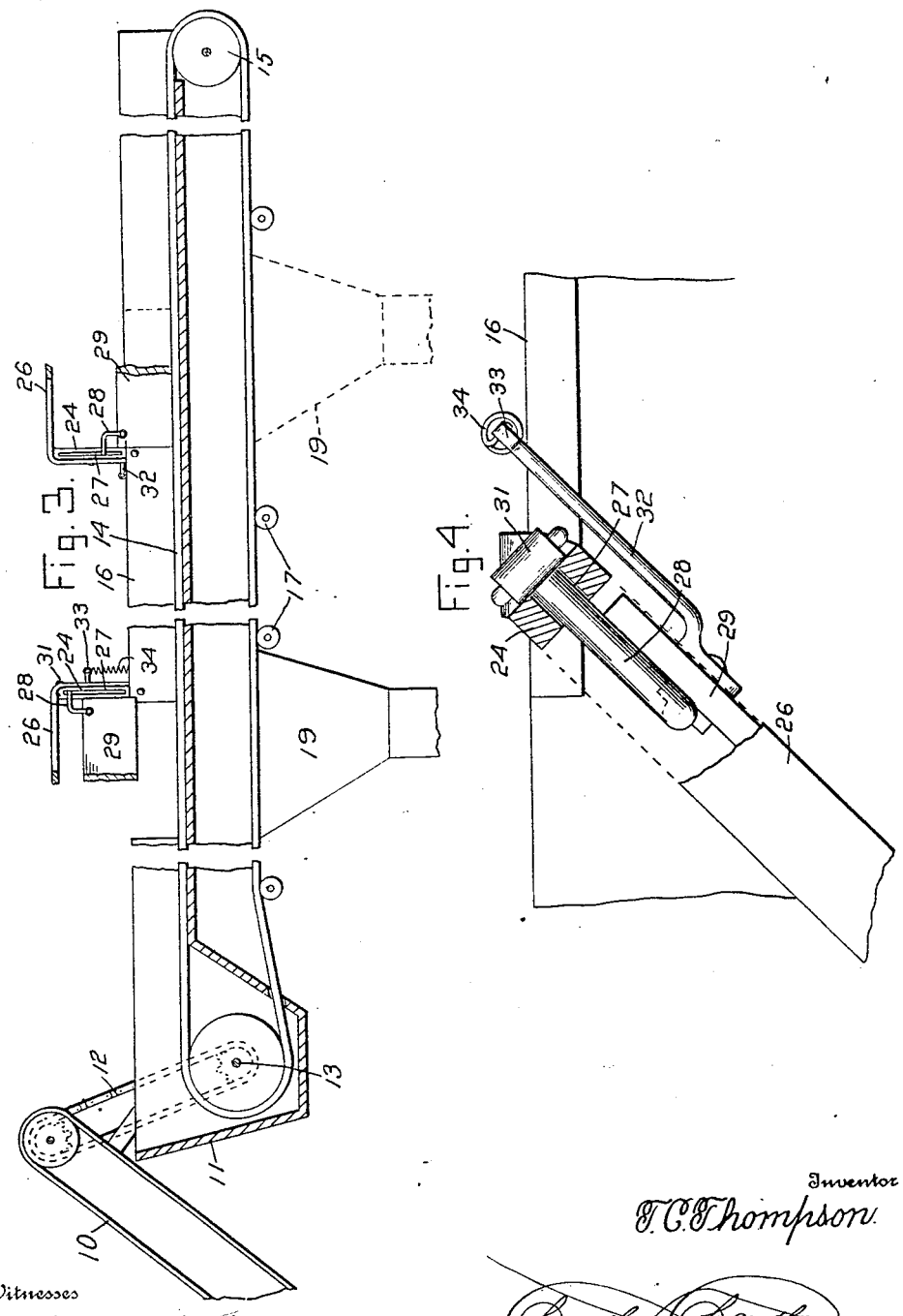

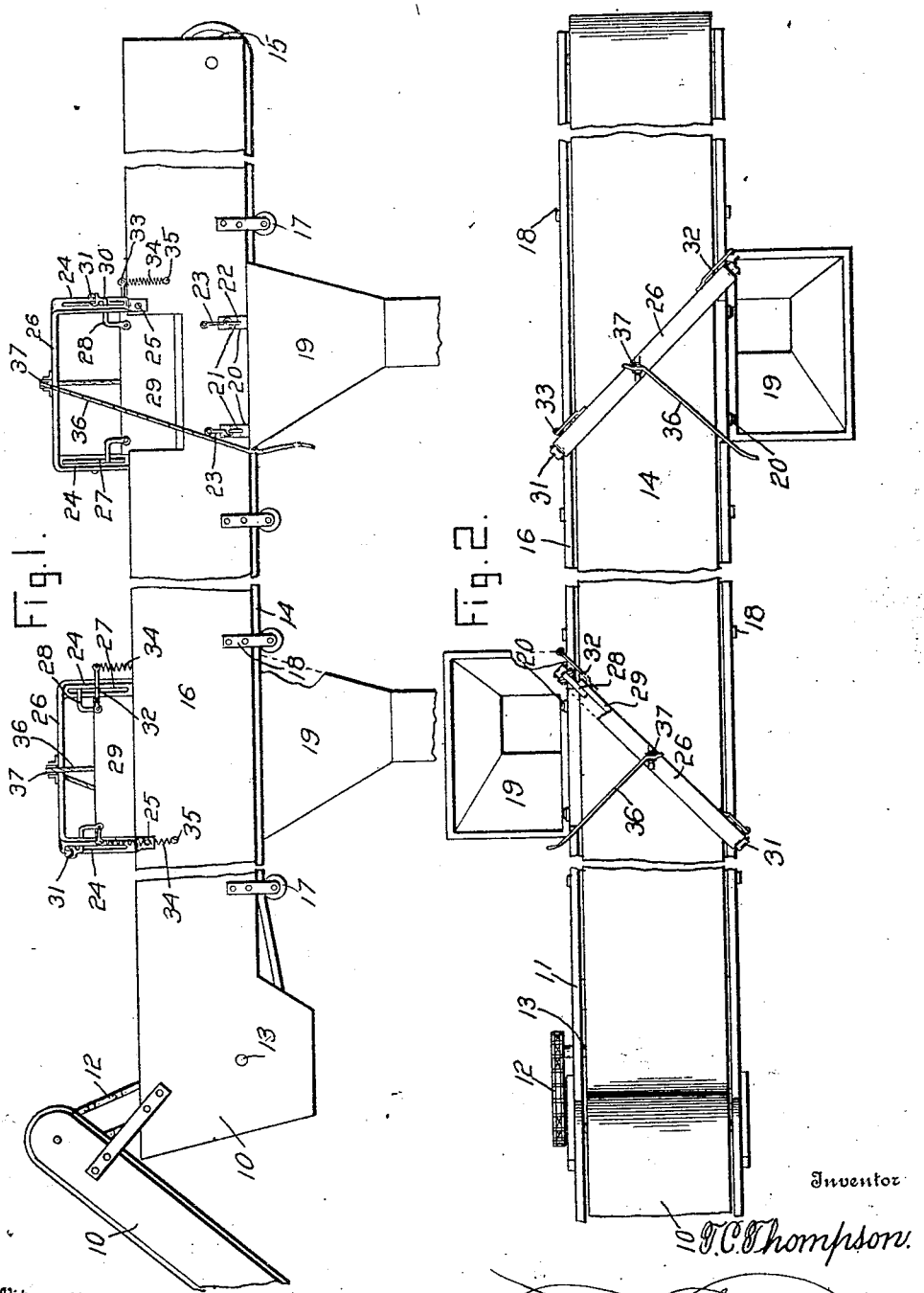

No. 877,141. PATENTED JAN. 21, 1908.
T. C. THOMPSON.
CONVEYER.
APPLICATION FILED FEB. 18, 1907.
3 SHEETS—SHEET 3.
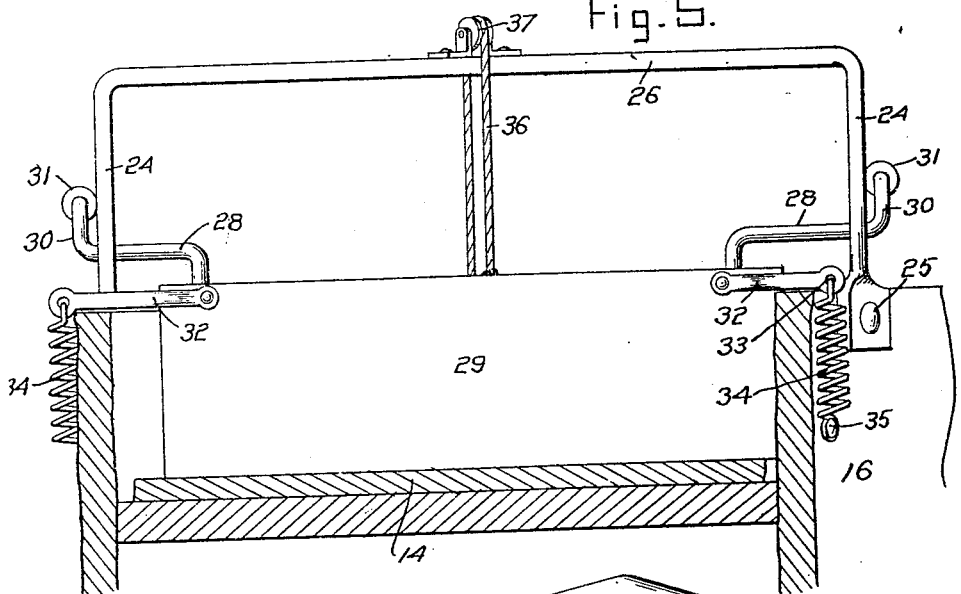
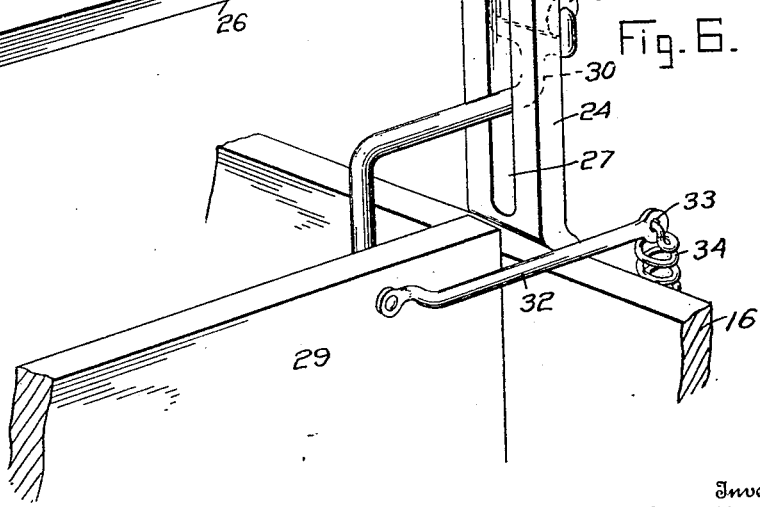

UNITED STATES PATENT OFFICE.

THEODORE C. THOMPSON, OF ROBERTS, ILLINOIS.

CONVEYER.

No. 877,141.      Specification of Letters Patent.      Patented Jan. 21, 1908.

Application filed February 18, 1907. Serial No. 358,139.

*To all whom it may concern:*

Be it known that I, THEODORE C. THOMPSON, a citizen of the United States, residing at Roberts, in the county of Ford, State of Illinois, have invented certain new and useful Improvements in Conveyers; and I do hereby declare the following to be a full, clear, and exact description of the invention, such as will enable others skilled in the art to which it appertains to make and use the same.

This invention relates to conveyers, and more particularly to a conveyer mechanism for distributing corn or other material from a main supply hopper to various cribs or the like, and the object of the invention is primarily to provide a mechanism of this nature which may be readily operated from the floor or ground to cause the same to discharge into either of the cribs desired.

In carrying out my invention I provide a trough or grain way in which a conveyer is arranged to travel, and arranged for slidable movement upon the trough, at points adjacent the cribs or the like into which the grain is to be discharged, is a gate or cut-off with which is connected a pull rod which leads to a point at which it may be readily reached to operate the gate.

In the accompanying drawings: Figure 1 is a side elevation of a conveyer mechanism constructed in accordance with my invention showing the manner of using the same, one of the gates being shown in lowered position and the other in raised position, Fig. 2 is a top plan view of the conveyer mechanism, Fig. 3 is a detail vertical longitudinal sectional view therethrough, Fig. 4 is a detail plan view of one portion of the mechanism showing the construction and manner of mounting the gates, parts of the mechanism being broken away to more clearly illustrate this figure, Fig. 5 is a detail vertical diagonal sectional view through the conveyer taken in a line with one of the gates, and, Fig. 6 is a detail perspective view of one of the gates and its frame.

Referring more specifically to the drawings, the conveyer mechanism is shown as comprising, in connection with an elevator 10, which is of the ordinary construction, and a hopper 11 into which the elevator discharges. One of the conveyer shafts for the elevator is shown as being connected by means of a sprocket chain 12 with a roller shaft 13 journaled in the hopper, and over this roller shaft is engaged a belt conveyer 14 which also travels over a roller 15 journaled at the far end of a trough 16. This last-named roller may be adjustable to take up the slack in the conveyer belt and it will be understood that any of the well-known means for adjusting such rollers now in use may be employed. To prevent sagging of the under stretch of the conveyer belt I have provided a number of rollers 17 which are journaled at their ends in suitable brackets 18 carried by the trough at its sides, and the lower stretch of this belt travels over the rollers and is supported thereby. It will, of course, be understood that this trough 16 is arranged to extend above a number of cribs, hoppers or the like, into which grain is to be discharged, and for a purpose to be presently explained the side of the trough 16 at which the discharge chutes, are arranged which chutes are to be presently described, is open at points corresponding to the cribs. The chutes 19 just mentioned are wider at their upper ends than at their lower ends and are provided with ears 20 which are slotted as at 21 for engagement with staples 22 carried by the said side of the trough upon opposite sides of the opening therein, and hooks 23 are pivoted upon the said side of the trough and are adapted to engage the staples and thereby secure the chutes to the trough. The gates or cut-offs for the trough are slidably supported in suitable guide frames and each of these frames comprises spaced parallel side members 24 which are secured at their lower ends as at 25 to opposite sides of the trough, and a connecting portion 26 which connects the upper ends of the side members 24. The frame extends in a plane diagonally across the trough and has one of its side members 24 secured to the side of the trough in which the openings are formed and to one side of one of the openings, and the other side member is secured to the opposite side of the trough and at a point corresponding to the opposite side of the said opening, it being understood that one of these frames is arranged in this position adjacent each opening. Each of the side members 24 is provided with a slot 27 and engaged through the slot for vertical movement therein is an arm 28 which is secured to a plate 29 adjacent the upper edge of the same, this plate serving as the gate or cut-off, in a manner to be presently explained. Each of the arms 28 is provided at the opposite side of the side portion 24 with a right angularly upturned portion 30 which is bifurcated and in the bifurcation of which is journaled a roller 31 which travels upon the outer face of the said side member. An arm 32 is secured to the opposite side of the plate 29 from the arm 28 and projects slightly outwardly from the plate and is thence turned laterally as clearly shown in Fig. 6 of the drawings. Each arm 32 extends slightly beyond its adjacent side member 24 and is provided with an eye 33 at its outer end to which is connected the upper end of a spring 34, the lower end of the spring being secured as at 35 to the corresponding side of the trough 16. The springs above described exert a downward pull upon their respective arms 32 and consequently upon the plate 29 and hence serve to move the plate into position with its lower edge resting upon the conveyer belt 14 to scrape the grain therefrom and direct it through the opening in the side of the trough 16 and through the respective chute 19. In order, however, that this gate or cut-off may be raised out of such engagement with the belt to permit grain to pass to some other cut-off or gate, a cable or chain 36 is connected with the upper edge of the plate 29 and is engaged over a roller 37 journaled upon the upper face of the connecting portion 26 of the guide frame of the plate, and from this roller it extends downwardly beneath the trough to such an extent that it may be readily grasped by a person standing on the floor of the building in which the conveyer is used to operate the cut-offs.

From the foregoing description it will be readily understood that when it is desired to deposit the grain into the first chute 19 of the series, the gate for this chute is allowed to lower and the grain will be directed by the gate into the chute. When, however, it is desired to discharge the grain through one of the other chutes of the series, this first gate is raised as are the succeeding ones with the exception of the one adjacent the chute in which the grain is to be discharged, the operation otherwise being the same.

What is claimed is:—

1. The combination with a trough having openings at one of its sides, and a conveyer arranged to travel in the trough, of spring-actuated means for normally engaging the conveyer and directing material therefrom and through the openings.

2. The combination with a trough having openings at one of its sides, and a conveyer arranged to travel in the trough, of spring-actuated means normally engaging the conveyer for directing material therefrom and through the openings, and means for displacing the last-named means.

3. The combination with a trough having openings at one of its sides, and a conveyer arranged to travel in the trough, of a spring-actuated gate arranged normally for engagement with the conveyer to direct material therefrom and through the openings.

4. The combination with a trough having openings at one of its sides, and a conveyer arranged to travel in the trough, of a spring-actuated gate arranged normally for engagement with the conveyer to direct material therefrom and through the openings, and means for moving the gate out of such engagement.

5. The combination with a trough having openings at one of its sides, and a conveyer arranged to travel in the trough, of a vertically movable spring actuated means normally engaging the conveyer to direct the material therefrom and through the openings, and means for raising the material directing means to inoperative position against the tension of the spring.

6. The combination with a trough having openings at one of its sides, and a conveyer arranged to travel in the trough, of a vertically movable gate supported diagonally across the trough in position to direct material from the conveyer through the openings, and springs arranged to normally hold the gate with its lower edge against the conveyer for the purpose stated, and means whereby the gate may be raised against the tension of the springs.

7. The combination with a trough having openings at one of its sides, and a conveyer arranged to travel in the trough, of a vertically movable gate disposed to extend diagonally across the trough and with its lower edge normally in engagement with the conveyer, springs connected with the gate for holding the same in such engagement, means for guiding the gate in its vertical movement, and a pull rope connected with the gate and adapted for operation to raise the gate against the tension of the springs.

In testimony whereof, I affix my signature, in presence of two witnesses.

THEO. C. THOMPSON.

Witnesses:
WM. WARNKE,
JNO. SMITH.